United States Patent
Foltyn et al.

(10) Patent No.: US 11,519,550 B2
(45) Date of Patent: Dec. 6, 2022

(54) STABILIZATION DEVICE AND METHOD FOR STABILIZING AN ATTACHMENT COMPONENT

(71) Applicant: FoMa Systems GmbH, Lauf (DE)

(72) Inventors: Roman Foltyn, Rückersdorf (DE); Rainer Märtin, Röthenbach (DE)

(73) Assignee: FOMA SYSTEMS GMBH, Lauf (DE)

( * ) Notice: Subject to any disclaimer, the term of this patent is extended or adjusted under 35 U.S.C. 154(b) by 0 days.

(21) Appl. No.: 17/220,539

(22) Filed: Apr. 1, 2021

(65) Prior Publication Data

US 2021/0310604 A1 Oct. 7, 2021

(30) Foreign Application Priority Data

Apr. 3, 2020 (DE) ...................... 10 2020 109 341.1

(51) Int. Cl.
*F16M 11/20* (2006.01)
*G01P 15/18* (2013.01)
(Continued)

(52) U.S. Cl.
CPC ........... *F16M 11/2078* (2013.01); *B62B 3/12* (2013.01); *F16M 11/24* (2013.01); *F16M 11/42* (2013.01);
(Continued)

(58) Field of Classification Search
CPC .... F16M 11/2078; F16M 11/24; F16M 11/42; G01C 21/18; B64C 47/08; H01Q 1/12;
(Continued)

(56) References Cited

U.S. PATENT DOCUMENTS 11,306,864 B1 * 4/2022 Hjelset ................... F16M 11/42
2011/0196581 A1 8/2011 Zurfluh
(Continued)

FOREIGN PATENT DOCUMENTS

CN 206551966 U 10/2017
DE 102015107483 A1 11/2016
(Continued)

OTHER PUBLICATIONS

German Office Action dated Jan. 20, 2021, DE Application 10 2020 109 341.1, 8 pages.
(Continued)

*Primary Examiner* — Tan Le
(74) *Attorney, Agent, or Firm* — Lucas & Mercanti, LLP; Klaus P. Stoffel (57) ABSTRACT

A stabilization device for stabilizing an attachment component relative to movements of a basic component which occur outside a permitted plane of movement. The attachment component and the basic component are connected via a stabilization arrangement that includes:

a first compensation arrangement for compensating rotational movements of the basic component with respect to an intermediate component, about rotational axes lying in the plane of movement, including a first compensation device which can be actuated actively, a second compensation arrangement for compensating residual linear movements of the intermediate component in a compensation direction, perpendicular to the plane of movement, in relation to the attachment component, having a second compensation device which can be actuated actively, a plurality of inertial sensors assigned to the first and/or second compensation arrangement, and (Continued)

a control device for actuating the compensation devices for movement compensation as a function of sensor data of the inertial sensors.

12 Claims, 3 Drawing Sheets

(51) Int. Cl.

| | | |
|---|---|---|
| *G01S 7/481* | (2006.01) | |
| *G01S 7/03* | (2006.01) | |
| *F16M 11/24* | (2006.01) | |
| *F16M 11/42* | (2006.01) | |
| *B62B 3/12* | (2006.01) | |
| *G03B 17/56* | (2021.01) | |
| *H01Q 1/18* | (2006.01) | |
| *G01C 21/18* | (2006.01) | |
| *B64D 47/08* | (2006.01) | |

(52) U.S. Cl.
CPC ............... *G01P 15/18* (2013.01); *G01S 7/03* (2013.01); *G01S 7/4811* (2013.01); *G03B 17/561* (2013.01); *B62B 2206/003* (2013.01); *B62B 2206/06* (2013.01); *B62B 2301/044* (2013.01); *B64D 47/08* (2013.01); *G01C 21/18* (2013.01); *H01Q 1/18* (2013.01)

(58) Field of Classification Search
CPC .. H01Q 1/18; H01Q 1/27; H01Q 1/34; H01Q 1/00; B62B 3/12; B62B 206/003; B62B 206/06; B62B 2301/044; G01P 15/18; G01S 7/03; G01S 7/4811; G03B 17/561
See application file for complete search history.

(56) References Cited

U.S. PATENT DOCUMENTS

| | | | |
|---|---|---|---|
| 2014/0267805 A1* | 9/2014 | Webb | H04N 5/23248 |
| | | | 348/208.2 |
| 2017/0260027 A1* | 9/2017 | DeBattiste | B66C 1/12 |
| 2018/0109730 A1 | 4/2018 | Wang | |
| 2020/0050087 A1* | 2/2020 | Su | F16M 11/123 |

FOREIGN PATENT DOCUMENTS

| | | | | |
|---|---|---|---|---|
| EP | 2650962 A1 | 10/2013 | | |
| GB | 2568481 A | 5/2019 | | |
| WO | 9731216 A1 | 8/1997 | | |
| WO | WO-2015022433 A1 * | 2/2015 | ............. | B60R 11/04 |
| WO | WO-2018010178 A1 * | 1/2018 | ............. | B64D 47/08 |

OTHER PUBLICATIONS

Chinese Patent Office issued Office Action dated Jul. 7, 2022 regarding parallel Chinese Patent Application No. 202110366220.6, 5 Pages.

\* cited by examiner

STABILIZATION DEVICE AND METHOD FOR STABILIZING AN ATTACHMENT COMPONENT

CROSS-REFERENCE TO RELATED APPLICATIONS

The present application claims priority of DE 10 2020 109 341.1, filed Apr. 3, 2020, the priority of this application is hereby claimed, and this application is incorporated herein by reference.

BACKGROUND OF THE INVENTION

The invention relates to a stabilization device for stabilizing an attachment component with respect to movements of a basic component which occur outside of a predetermined plane of movement, wherein the attachment component and the basic component are connected via a stabilization arrangement. In addition, the invention also relates to a method for stabilizing an attachment component.

In many applications, it is expedient for a use device which can be attached to an attachment component to be mounted in a way which is as free of vibrations as possible. It is frequently desired in this context that movement components which are present within a predetermined plane of movement, usually the horizontal plane, are permitted, that is to say for example the use device can move randomly in a horizontal plane. Examples of such use devices comprise in the first instance cameras which are used, for example, for recording films and the like. Such cameras have to be kept as stable as possible as far as vibrations and the like are concerned, for which purpose a multiplicity of approaches for stabilization have already been proposed. For example, camera stabilization devices which are to be carried by a person or in some other way are known as described, in DE 10 2015 107 483 A1. Such camera stabilization devices (also referred to as camera balance devices) are extremely complex and expensive equipment.

Another example of use devices are also sensor devices, for example in an application for autonomous driving and/or in applications for the most precise possible measurement of target objects, in particular buildings, where a corresponding measuring device is moved, for example, by means of a crane. In this respect, computational movement component algorithms which evaluate recorded sensor data are already known, but they are extremely costly to implement and are at least to a certain extent not sufficiently robust and/or precise.

Problems occur in the stabilization of use devices whenever ground-based platforms are to be used for the movement of the use device. In this context, typical vibrations occur owing to the ground being driven over, which vibrations have to be reduced for the desired frictionless functioning of the use device. Such undesired movements, originating for example from uneven areas of the ground, constitute a main type of the movements which have to be compensated and which occur outside the then, in particular, horizontal, predetermined plane of movement.

SUMMARY OF THE INVENTION

The invention is based on the object of making available an easily implemented, high-precision and reliable possible way of compensating undesired movements of an attachment component for a use device, in particular for compensating movement vibrations of a platform which is, in particular, operated on the ground.

In order to achieve this object, according to the invention a stabilization device and method are provided, wherein the stabilization arrangement comprises:
- a first compensation arrangement for compensating inclination movements of the basic component with respect to an intermediate component, about inclination axes lying in the plane of movement, comprising at least one first compensation device which can be actuated actively,
- a second compensation arrangement for compensating residual linear movements of the intermediate component in a compensation direction, perpendicular to the plane of movement, in relation to the attachment component, having at least one second compensation device which can be actuated actively,
- a plurality of initial sensors which are respectively assigned to the first and/or second compensation arrangement, and
- at least one control device for actuating the compensation devices of the compensation arrangements for the purpose of movement compensation as a function of sensor data of the initial sensors.

Within the scope of the present invention it has been realized that undesired movements, consequently in particular movements outside the predetermined plane of movement, for example driving vibrations, can be particularly advantageously split into two groups which can be successively compensated with relative low expenditure and relatively high precision. Consequently, the reduction in undesired movements according to the present invention can be performed in two stages, specifically firstly stabilization in the plane of movement can be performed, and after this stabilization in the compensation direction perpendicular thereto is carried out.

This means specifically that an intermediate component is provided between the basic component and the attachment component to which a use device can be attached. A first compensation arrangement connects the basic component to the intermediate component. The first compensation arrangement has first compensation devices which is capable of compensating pivoting about inclination axes in the movement plane (tilting axes or pivoting axes), that is to say of compensating inclination movements (tilting movements or pivoting movements), in particular by means of opposed, relative pivoting of the intermediate component with respect to the basic component which is subjected to the undesired movement component. In other words, sensor data of the inertial sensors are used to detect inclination movements and, as it were, counteract them directly by means of the at least one first compensation device, more details of which will be given below.

After this first stage, ideally only linear movements in the compensation direction which is perpendicular with respect to the plane of movement remain for the intermediate component which movements can be compensated as far as possible by the second compensation arrangement which connects the intermediate component and the attachment component. For this purpose, the second compensation arrangement has at least one second compensation device, in order to compensate, in the compensation direction, linear movements which are detected by the inertial sensors, said compensation being carried out, in particular, by means of an opposed relative movement, with the same amplitude, of the attachment component with respect to the intermediate component which is subjected to the linear movement.

Specifically, the sensor data of the inertial sensors is evaluated here by means of a control device in order to derive a corresponding actuation, specifically in particular control signals for the first and second compensation devices. In this context, the inertial sensors can preferably already be arranged on components, in particular therefore the basic component, the intermediate component and/or the attachment component or be rigidly coupled thereto in terms of movement, after which required compensation movements can then be easily derived, while it is, however, also perfectly conceivable to provide at least some of the inertial sensors on other components of the stabilization device, in particular of a platform which supports the stabilization arrangement, in order to use mathematical relationships in order to derive suitable control commands. Methods for deriving as far as possible in real time control signals for compensation movements from sensor data are basically known in the prior art and can be implemented here with particular efficiency and speed, since according to the invention the movements which are to be compensated are divided into the inclination movements and the linear movements, as described. In particular, two actuation processes can be implemented and carried out completely independently.

In many applications there can be provision that the predetermined plane of movement is an at least essentially horizontal plane, and the compensation direction is at least essentially the vertical direction. If use devices are moved over an essentially planar surface with uneven areas, for example, by means of a platform of the stabilization devices, which has wheels, the movements on this surface are to be considered as desired and not to be compensated, while uneven areas of the ground, upward oscillation processes as a result of the movement and movements derived therefrom are to be compensated, which movements can be correspondingly divided into movements about the inclination axes within the plane of movement and the direction which is perpendicular with respect to the plane of movement, and consequently vertical here. It is to be noted that the control device can also be designed to classify linear movements in the compensation direction into desired and undesired movement areas, in order only to compensate the undesired movement areas. If, for example, the use device is moved out an oblique plane, a continuous change in height occurs, the compensation of which could exceed the compensation possibilities of the second compensation arrangement at a specific point in time, and it is clearly also desired so that, for example, a continuous, accumulating change component can be exempted from the compensation measures.

The inertial sensors can particularly advantageously be present in particular individually and/or in groups, as part of an inertial measuring unit (IMU) and/or can comprise acceleration sensors and/or rotational speed sensors. Such IMUs constitute a spatial combination of a plurality of inertial sensors such as acceleration sensors and/or rotational speed sensors and are able to sense all the six possible kinematic degrees of freedom. Specifically, three acceleration sensors (translation sensors) which are respectively positioned orthogonally on one another can be provided for sensing the translatory movement, and three rotational speed sensors (gyroscopic sensors) which are provided orthogonally with respect to one another can be provided for sensing inclination movements. In this context, such IMUs are already available as compact, prefabricated units, for example integrated chips, and can also be correspondingly used within the scope of the present invention. The IMUs are preferably arranged selectively here in such a way that the coordinate system in which the sensor data is measured correspondingly corresponds to the coordinate system which is formed by the plane of movement and the compensation direction and in which the compensation takes place, if appropriate with a shifted zero point. An IMU can preferably be provided within the scope of the present invention and can be implemented, in particular, as an integrated chip.

At least a first of the inertial sensors, in particular a first inertial measuring unit, is expediently arranged at least on the basic component and/or rigidly coupled thereto in respect of movement. All movements which are to be compensated can be basically measured on the basic component, specifically that is to say inclination movements about two inclination axes which are perpendicular with respect to one another in the plane of movement as well as linear movements in the compensation direction.

In one particularly advantageous development of the present invention there can be provision that at least one second inertial sensor, in particular one second inertial measuring unit is arranged on the intermediate component or is rigidly coupled thereto in terms of movement, and at least one third inertial sensor, in particular one third inertial measuring unit, is arranged on the attachment component or is rigidly coupled thereto in terms of movement, wherein the control device is designed to perform a first compensation process on the basis of the sensor data of the first inertial sensor and to perform a second compensation process of residual movements measured by the second and third inertial sensor, on the basis of the sensor data of the second and third inertial sensors. The control device can therefore use sensor data of the first inertial sensor, in particular of the first IMU, for both compensation arrangements, in order to firstly carry out a type of rough compensation of movements on the basis of the corresponding sensor data. The at least one second inertial sensor, in particular the second IMU, advantageously measures residual movement remaining at the intermediate component, which movements can be taken into account in a second compensation process which acts as a fine compensation process. The at least one third inertial sensor, in particular the third IMU, correspondingly measures linear residual movements of the attachment component in the compensation direction and can also add a fine compensation process here as a second compensation process. In this way, a particularly robust and wide ranging reduction in undesired movements at the attachment component is possible.

The control device can have separate control units for the actuation of the compensation arrangements, in particular one control chip in each case. As has already been stated, the individual compensation processes (inclination movements and linear movements by the first or second compensation arrangement) can be carried out independently of one another, so that separate control units can be implemented with, in particular, separate control algorithms and/or separate control hardware. For example, it is conceivable to provide a respective control chip, as part of the control device, for each compensation arrangement. In the advantageous configuration with three IMUs just presented, which has an IMU on each of the three components of the basic component, intermediate component and attachment component or is completely coupled in terms of movement to said components, the control unit which is assigned to the first compensation arrangement therefore receives sensor data of the first IMU and of the second IMU, and the control unit which is assigned to the second compensation arrangement receives sensor data of the first and third IMUs.

The intermediate component can be mounted so as to be pivotable against the basic component by means of a universal joint or ball joint. A universal joint can also be referred to here as a cardan joint. Consequently, a gimbal mount of the intermediate component with respect to the basic component is particularly preferred, wherein the specific relative position of the intermediate component with respect to the basic component can be influenced by the at least one first compensation device.

The first compensation arrangement can have at least one first compensation device for pivoting the intermediate component about a first inclination axis lying in the predetermined plane of movement, and at least one first compensation device for pivoting the intermediate component about a second inclination axis which is perpendicular with respect to the first inclination axis and also lies in the predetermined plane of movement. All the pivoting processes out of the predetermined plane of movement can be represented by combined movements about the two inclination axes. In one specific development of the present invention, there can be provision here that the first compensation devices for each inclination axis comprise two linear actuators, in particular spindle drives, which support a contact element, for example a ball plunger, which makes contact with the intermediate component. Such linear actuators can be arranged, for example, symmetrically about the universal joint or ball joint, in each case along the respective other inclination axis, wherein the intermediate component with gimbal suspension is ultimately supported by the contact elements, and movements which are coordinated by the respective two associated linear actuators of said contact elements bring about corresponding pivoting about the inclination axis which is perpendicular with respect to the connection axis of the linear actuators. If the two directions in the plane of movement in which the linear actuators which are respectively assigned to one of the inclination axes are arranged are denoted by X and Y, one of the linear actuators can be designated as +X actuator, one as −X actuator, one as +Y actuator and one as −Y actuator. Of course, refinements in which a corresponding linear actuator of a first compensation device which is assigned to one of the inclination axes is also fixedly connected to the intermediate component, so that a linear actuator is sufficient for each inclination axis, are also conceivable. The linear actuators can preferably be formed by spindle drives, in particular operated by means of a corresponding electric motor, wherein, of course, other implementations can also be used for linear actuators, in particular depending on the required compensation speed.

The at least one second compensation device can preferably comprise a linear motor for a carriage which is guided in a linear guide, but can also likewise be implemented by other linear actuators.

Of course, other types of linear actuators are basically conceivable and can be used both for the first and the second compensation devices, but owing to rapid reaction times an electromagnetically operated actuator system is preferred. Piezo-actuators can also prove advantageous, in particular when relatively small movement amplitudes are to be compensated. Moreover, pivoting actuators of a known type are basically also conceivable for the first compensation device, which actuators can then, for example, be at least partially integrated into the universal joint and/or ball joint.

It has also proven expedient within the scope of the present invention if the attachment component and/or the intermediate component and/or the basic component are/is embodied as a plate which extends in the predetermined plane of movement in a basic state in which the components are arranged in parallel. This means that the attachment component, the intermediate component and the basic component can be implemented, for example, as an attachment plate, intermediate plate and basic plate which preferably extend in the plane of movement, wherein this should, of course, apply permanently to the attachment plate given ideal compensation.

It is also preferred if the stabilization device comprises a component housing which is arranged in particular on the basic component and/or a baseplate which supports the basic component, is, in particular, hollow cylindrical and at least partially surrounds the stabilization device. Such a hollow-cylindrical component housing can conceal, for example, on the one hand, the compensation arrangement to prevent it being seen, but on the other hand it can also protect it. For example, the stabilization device can then be offered as a type of "riser" from which, for example, the attachment plate or an attachment device for the use device of the attachment plate, or generally of the attachment component, projects, while the compensation actuator system can continue to be concealed per se.

As already indicated, the attachment component can also have an attachment device for a use device which is to be attached, in particular a camera arrangement and/or a sensor device, for example comprising a lidar sensor and/or a radar sensor, and/or a measuring arrangement. In this context, it is possible to use both standardized attachment devices, which can be employed for various use devices, as well as specific attachment devices which are adapted to specific use devices.

In one particularly advantageous refinement of the present invention, the stabilization device can also comprise a platform which can be moved while being supported on the ground, in particular via three positioning points, to which platform the basic component is secured and/or which platform comprises the basic component. Such a ground-based platform can be operated, for example, by means of chains and/or a hoover drive, but the use of wheels is preferred according to the invention. In this context, a three-point support on the ground is particularly advantageously used, so that there can in particular be provision that the platform has precisely three wheels. Such ground supports with three positioning points, in particular three wheels, which are preferably arranged in the manner of an equilateral triangle, have proven an extremely stable option which directly permits vibrations which are input into the basic component, or other undesired movements, to be kept small. In this respect, in comparison with a, for example, four-wheeled ground-mounting system, means there are already significantly fewer undesired movements which occur over a slower time scale and/or can be predicted better in terms of their profile which makes a higher compensation quality possible and simplifies the real-time implementation which is provided.

Further particularly preferred measures in order to already reduce from the outset movements which are undesired also comprise the use of a soft material for the running faces of the wheels, which can have, for example, rubber tires and/or be entirely composed of rubber. The soft material yields when there are uneven areas in the ground so that the positioning surface can at least partially adapt itself and as a result the inputting of movement into the platform and therefore also the basic component can be at least partially avoided. In this way, inputs of movement as a result of a cable or the like being driven over, which resulted in large, suddenly occurring movements which had to be compensated, constitute a significantly less serious problem.

In this respect a further, particularly preferred, refinement of the present invention provides that a bearing point of the intermediate component against the basic component, in particular that is to say the location at which the intermediate component is gimbal-suspended from the basic component, is arranged at the level of a surrounding platform component or even lowered against it, in particular at the level of the wheels. The underlying concept is to arrange the bearing point or suspension point as low as possible, in order in this way to reduce the reinforcement of inputs into the movement which occur as a result of excessively large transmission paths, for example to avoid as far as possible relatively high amplitudes which occur as a result of a lever effect. In this context, the expression "at the level of the wheels" is to be understood as meaning that the bearing point is located within it level range spanned by the wheels, preferably at the level of the wheel axle or at least at the level of the upper end of the wheels. Tests have shown that such a gimbal-suspension point is ideally arranged in the plane of the wheels.

In this context it is also to be noted that a further reduction of movements which are input can also be achieved by configuring the platform component, in particular the baseplate, and/or the basic component in a solid fashion in order to advantageously utilize the inertia effects. For example, the weight of the platform can be at least four times, in particular at least ten times, an envisaged payload, for example the weight of the use device.

It is also to be noted at this point that the stabilization device does not necessarily have to have a platform which is ground-based or operated on the ground but rather it is also possible to configure the stabilization device, for example, as being carried by a person, for example by means of corresponding coupling elements to the person and the like. In addition, the stabilization device according to the invention can be particularly advantageously also used in motor vehicles, in particular without a separate platform, wherein in particular reference is made to a possible use in autonomously operated vehicles where the stabilization arrangement can be used to support in a stabilized fashion, for example, sensor devices, in particular comprising lidar sensors and/or radar sensors and/or cameras. The stabilization device according to the invention can also be particularly advantageously used for measurement arrangements as use devices, for example for high-precision measurement of buildings, wherein the stabilization device with a measuring arrangement which is attached to the attachment component can be carried, for example, by a crane.

In addition to the stabilization device, the present invention also relates to a method for stabilizing an attachment component with respect to movements of a basic component which occur outside a predetermined plane of movement, in particular using a stabilization device according to the invention, wherein the attachment component and the basis component are connected via a stabilization arrangement, wherein the method is distinguished by the fact that in a first step inclination movements of the basic component about inclination axes lying in the plane of movement are compensated, and in a second step residual linear movements of the intermediate component in a compensation direction which is perpendicular to the plane of movement are compensated. All the statements relating to the stabilization device according to the invention can also be analogously transferred to the method according to the invention with which the advantages already mentioned can consequently also be achieved.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
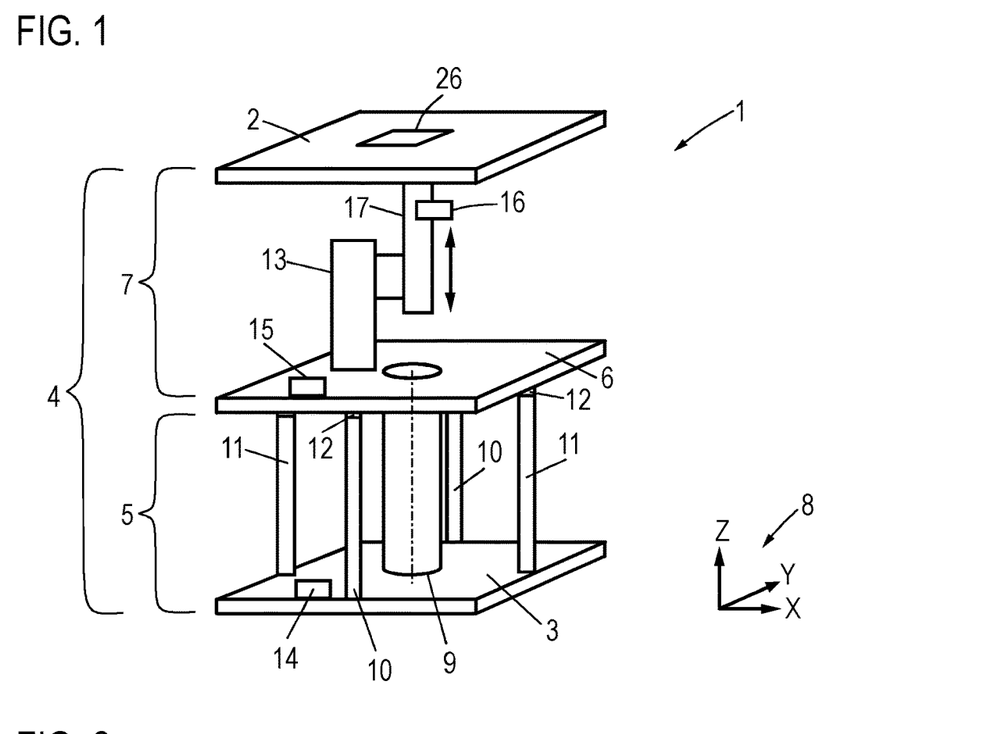
FIG. 1 shows a schematic rough sketch showing the basic design of a stabilization device according to the invention.

FIG. 1 shows a schematic rough sketch of essential components of a stabilization device 1 according to the invention. The latter comprises an attachment component 2 which is embodied as an attachment plate and which is to be stabilized with respect to undesired movements of a basic component 3 which is embodied as a baseplate. For this purpose, the stabilization device 1 has a stabilization arrangement 4 which connects the attachment component 2 and the basic component 3 and is formed by a first compensation arrangement 5, which connects the basic component 3 to an intermediate component 6 which is embodied as an intermediate plate, and a second compensation arrangement 7 which connects the intermediate component 6 to the attachment component 2. In this context, undesired movements outside a predetermined plane of movement, here the X-Y plane shown by the coordinate system 8 are to be compensated, wherein this takes place in two stages which are independent of one another.

The first compensation arrangement 5 is designed to compensate inclination movements about inclination axes lying in the predetermined plane of movement (X-Y plane, here horizontal plane), while the second compensation arrangement 7 is intended to compensate residual linear movements in a compensation direction which is perpendicular thereto (here the Z direction or vertical direction).

In order to make this basically possible, the intermediate component 6 is to be initially gimbal-suspended with respect to the basic component 4 by means of a universal joint (cardan joint 9) which is only indicated here, wherein in the present case a first inclination axis is defined along the X direction and a second inclination axis is defined along the Y direction, each of which directions is assigned two linear actuators 10, 11 which each support a contact element 12 on which the intermediate component 6 rests. Vertical adjustment of the contact elements by means of the linear actuators 10, 11, which serve as first compensation devices, makes it possible to bring about relative pivoting of the intermediate component 6 with respect to the basic component 3. The linear actuators 10 which are assigned to the first inclination axis are arranged symmetrically spaced apart here along the Y direction around the universal joint 9, and the linear actuators 11 assigned to the second inclination axis are correspondingly arranged along the X direction.

The second compensation arrangement 7 has a linear actuator 13 which serves as a second compensation device and via which the adjustment in the compensation direction, here the Z direction, is brought about.

In order to be able to detect compensating movements, the stabilization device 1 also has a plurality of initial sensors, here each in the form of inertial measuring units 14, 15, 16 (IMUs), wherein a first IMU 14 is arranged on the basic component 3, a second IMU 15 is arranged on the intermediate component 6, and a third IMU 16 is arranged on the attachment component 2 or a component 17, rigidly connected thereto, of the linear actuator 13.

Figure 2:
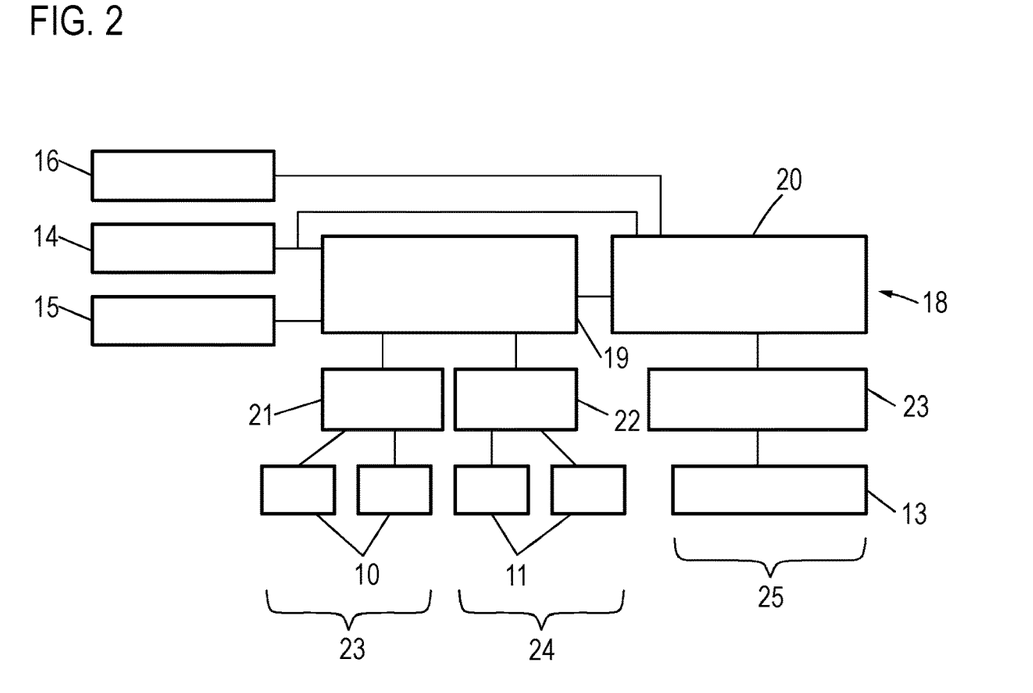
FIG. 2 shows the electronic connection of components of the stabilization device.

The stabilization device 1 also has an associated control device 18 which is explained in more detail with respect to FIG. 2 and has here two control units 19, 20 which are embodied as separate control chips, here CPUs. In this context, the control unit 19 is assigned to the first compensation arrangement 5 and receives sensor data of the first IMU 14 and of the second IMU 15, in order to detect inclination movements which are to be compensated. In this context, control is carried out in response to inclination movements which are detected by means of the first IMU 14 as a first compensation process (rough compensation), while residual inclination movements can be detected by means of the second IMU 15 and subsequently compensated in a second compensation process (fine compensation). Corresponding control signals for compensating inclination movements by means of opposing relative rotations of the intermediate component 6 with respect to the basic component 3 are generated and passed on to motor drivers 21, 22. The motor driver 21 is assigned to the first compensation device 23, formed by the linear actuators 10 for the first inclination axis, of the first compensation arrangement 5, and the motor driver 22 is assigned to the first compensation device 24, assigned by means of the linear actuators 11 for the second inclination axis, of the first compensation arrangement 5.

The control unit 20 evaluates the sensor data of the first IMU 14 and of the third IMU 16 in order to utilize in turn the sensor data of the first IMU 14 with respect to a first compensation process (rough compensation), and the sensor data of the third IMU 16 for a fine compensation process, in this case with respect to linear movements in the compensation direction (Z direction). The evaluation can comprise here a classification into desired and undesired movement components in order to rule out, for example, continuously rising and falling movement components from the compensation. Relative displacement processes between the intermediate component 6 and the attachment component 2, which counteract the linear movement to be compensated, are determined and correspondingly control signals are passed on to a motor driver 23 for the linear actuator 13 as a second compensation device 25 of the second compensation arrangement 7.

If a use device is then consequently attached to the attachment component 2 via an attachment device 26 of the attachment component 2, a corresponding stabilization process can take place, for example for lidar sensors, radar sensors and the like in autonomously driving vehicles for which a computational compensation process can be dispensed with. Further application areas comprise, for example, measuring arrangements for high-precision building measurements on cranes, but in particular also use devices which are moved in a ground-based fashion, by means of a corresponding platform, which is ground-based or operated on the ground, of the stabilization device 1, said use devices being, for example, cameras for films and the like.

Figure 3:
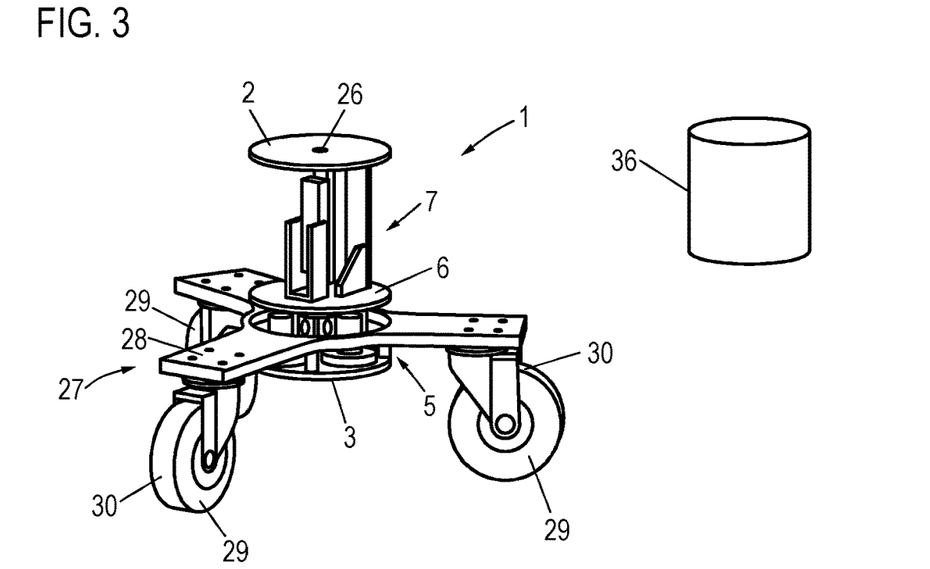
FIG. 3 shows a perspective view of an exemplary embodiment of the stabilization device according to the invention.
Figure 4:
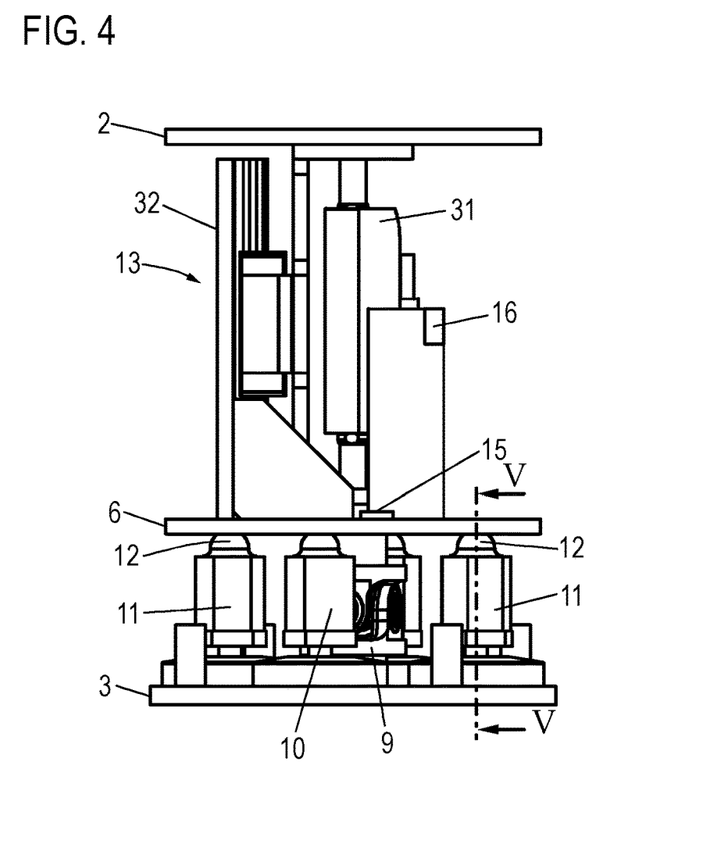
FIG. 4 shows a partial lateral view of the stabilization device in FIG. 3.
Figure 5:
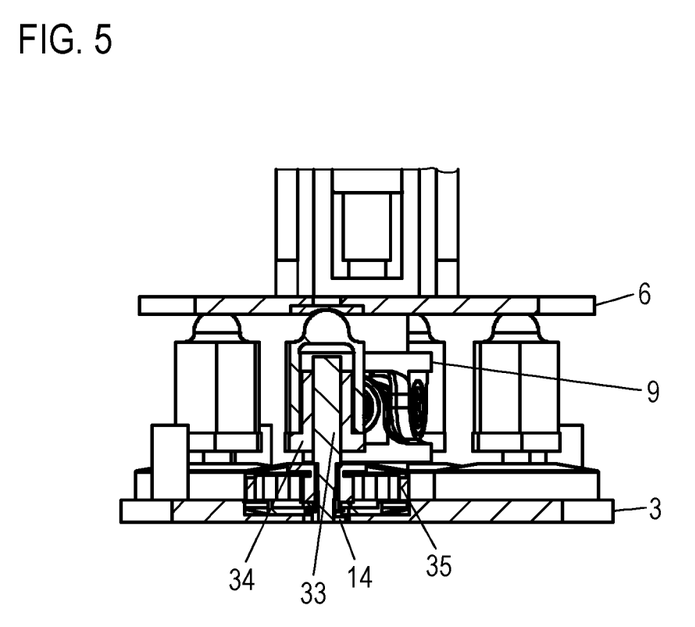
FIG. 5 shows a sectional view according to the sectional line V-V in FIG. 4.

A corresponding specific exemplary embodiment is shown by FIGS. 3-5.

Accordingly, the stabilization device 1 of the specific exemplary embodiment comprises a platform 27 with a baseplate 28 and three wheels 29 which are arranged in the manner of an equilateral triangle and in which at least the running tread 30 is formed from rubber. These are consequently rubber wheels. The base component 3, the attachment component 2, the intermediate component 6 and the first and second compensation arrangements 5, 7 are supported by the baseplate 28, which is moreover of solid design, for example is composed of a heavy metal.

Support on the ground with three positioning points which are given by the wheels 29, and the soft running tread material of the wheels 29, already permit inputs of movements into the baseplate 28 to be damped, wherein the amplitudes are likewise kept low by the solid heavy configuration thereof.

As is also apparent from FIG. 3, the basic component 3 is positioned lowered with respect to the baseplate 28, so that the bearing point (gimbal-suspension point) of the intermediate component 6 with respect to the basic component 3 also lies at a lower position, in particular at the level of the baseplate 28 or even in the region of the wheels 29, in order to position the latter as close as possible to the ground.

The residual undesired movements are compensated as far as possible by the compensation measures shown in more detail in FIGS. 4 and 5. The linear actuators 10, 11 are embodied here as spindle drives, and the contact elements 12 as ball plungers. The linear actuator 13 is embodied as a linear motor 31 with a linear guide 32.

FIG. 5 shows in more detail the configuration of the spindle drives with a spindle 33, a carriage 34 and a motor 35.

The stabilization device 1 of the specific exemplary embodiment can, as is also indicated in FIG. 3, also have a hollow-cylindrical component housing 36 which can be positioned around the stabilization arrangement 5, in order to protect it against being seen and against damage.

While specific embodiments of the invention have been shown and described in detail to illustrate the inventive principles, it will be understood that the invention may be embodied otherwise without departing from such principles.

We claim:

1. A stabilization device for stabilizing an attachment component with respect to movements of a basic component which occur outside a permitted plane of movement, wherein the attachment component and the basic component are connected via a stabilization arrangement, wherein the stabilization arrangement comprises:
 a first compensation arrangement for compensating inclination movements of the basic component with respect to an intermediate component, about inclination axes lying in the plane of movement, comprising at least one first compensation device which can be actuated actively,
 a second compensation arrangement for compensating residual linear movements of the intermediate component in a compensation direction, perpendicular to the plane of movement, in relation to the attachment component, having at least one second compensation device which can be actuated actively, a plurality of inertial sensors which are respectively assigned to the first and/or second compensation arrangement, and at least one control device for actuating the compensation devices of the compensation arrangements for the purpose of movement compensation as a function of sensor data of the inertial sensors, wherein said device also comprises a platform which can be moved while being supported on the ground, in particular via three positioning points, to which platform the basic component is secured and/or which platform comprises the basic component, and wherein a bearing point of the intermediate component is arranged against the basic component at the level of a surrounding platform component or lowered against the latter, in particular at the level of the wheels.

2. The stabilization device according to claim 1, wherein the plane of movement is an at least essentially horizontal plane, and the compensation direction is at least essentially the vertical direction.

3. The stabilization device according to claim 1, wherein the inertial sensors are, in particular separately and/or in groups, part of an inertial measuring unit and/or comprise acceleration sensors and/or rotational speed sensors.

4. The stabilization device according to claim 1, wherein at least a first of the inertial sensors, in particular a first inertial measuring unit, is arranged at least on the basic component or rigidly coupled thereto in terms of movement.

5. The stabilization device according to claim 4, wherein at least one second inertial sensor, in particular one second inertial measuring unit is arranged on the intermediate component or is rigidly coupled thereto in terms of movement, and at least one third inertial sensor, in particular one third inertial measuring unit, is arranged on the attachment component or is rigidly coupled thereto in terms of movement, wherein the control device is designed to perform a first compensation process on the basis of the sensor data of the first inertial sensor and to perform a second compensation process of residual movements measured by the second and third inertial sensor, on the basis of the sensor data of the second and third inertial sensors.

6. The stabilization device according to claim 1, wherein for the purpose of actuating the compensation arrangements the control device has separate control units, in particular one control chip in each case.

7. The stabilization device according to claim 1, wherein the intermediate component is mounted so as to be pivotable with respect to the basic component by means of a universal joint or ball joint.

8. The stabilization device according to claim 1, wherein the first compensation arrangement has at least one first compensation device for pivoting the intermediate component about a first inclination axis lying in the plane of movement, and at least one first compensation device for pivoting the intermediate component about a second inclination axis which is perpendicular to the first inclination axis.

9. A stabilization device for stabilizing an attachment component with respect to movements of a basic component which occur outside a permitted plane of movement, wherein the attachment component and the basic component are connected via a stabilization arrangement, wherein the stabilization arrangement comprises:

a first compensation arrangement for compensating inclination movements of the basic component with respect to an intermediate component, about inclination axes lying in the plane of movement, comprising at least one first compensation device which can be actuated actively, a second compensation arrangement for compensating residual linear movements of the intermediate component in a compensation direction, perpendicular to the plane of movement, in relation to the attachment component, having at least one second compensation device which can be actuated actively, a plurality of inertial sensors which are respectively assigned to the first and/or second compensation arrangement, and at least one control device for actuating the compensation devices of the compensation arrangements for the purpose of movement compensation as a function of sensor data of the inertial sensors, wherein the first compensation arrangement has at least one first compensation device for pivoting the intermediate component about a first inclination axis lying in the plane of movement, and at least one first compensation device for pivoting the intermediate component about a second inclination axis which is perpendicular to the first inclination axis, wherein the first compensation devices comprise in each case two linear actuators, in particular spindle drives, for each inclination axis, said linear actuators supporting a contact element, in particular a ball plunger, which makes contact with the intermediate component.

10. The stabilization device according to claim 1, wherein the at least one second compensation device comprises a linear motor for a carriage which is guided in a linear guide.

11. A stabilization device for stabilizing an attachment component with respect to movements of a basic component which occur outside a permitted plane of movement, wherein the attachment component and the basic component are connected via a stabilization arrangement, wherein the stabilization arrangement comprises:

a first compensation arrangement for compensating inclination movements of the basic component with respect to an intermediate component, about inclination axes lying in the plane of movement, comprising at least one first compensation device which can be actuated actively, a second compensation arrangement for compensating residual linear movements of the intermediate component in a compensation direction, perpendicular to the plane of movement, in relation to the attachment component, having at least one second compensation device which can be actuated actively, a plurality of inertial sensors which are respectively assigned to the first and/or second compensation arrangement, and at least one control device for actuating the compensation devices of the compensation arrangements for the purpose of movement compensation as a function of sensor data of the inertial sensors, wherein the attachment component and/or the intermediate component and/or the basic component is embodied as a plate which extends in the plane of movement in a basic state in which the components are arranged in parallel, and/or the stabilization device comprises a component housing which is arranged on the basic component, is in particular hollow cylindrical, and at least partially surrounds the stabilization arrangement, and/or the attachment component has an attachment device for a use device which is to be attached, in particular a camera arrangement and/or a lidar sensor and/or a radar sensor and/or a measuring arrangement.

12. The stabilization device according to claim 1, wherein the platform has precisely three wheels, and/or the wheels have a rubber running face.

\* \* \* \* \*